(12) United States Patent
Almalki et al.

(10) Patent No.: US 10,012,509 B2
(45) Date of Patent: Jul. 3, 2018

(54) UTILIZING CAMERA TO ASSIST WITH INDOOR PEDESTRIAN NAVIGATION

(71) Applicant: BlackBerry Limited, Waterloo (CA)

(72) Inventors: Nazih Almalki, Waterloo (CA); Robert George Oliver, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 24 days.

(21) Appl. No.: 14/939,529

(22) Filed: Nov. 12, 2015

(65) Prior Publication Data
US 2017/0138740 A1    May 18, 2017

(51) Int. Cl.
| | |
|---|---|
| G01C 21/20 | (2006.01) |
| H04W 4/04 | (2009.01) |
| H04N 5/225 | (2006.01) |
| H04N 5/247 | (2006.01) |
| G06T 7/00 | (2017.01) |
| G06T 7/20 | (2017.01) |

(52) U.S. Cl.
CPC ............ G01C 21/206 (2013.01); G06T 7/004 (2013.01); G06T 7/0026 (2013.01); G06T 7/2093 (2013.01); H04N 5/2257 (2013.01); H04N 5/247 (2013.01); H04W 4/043 (2013.01)

(58) Field of Classification Search
CPC .................................................... G01C 21/20
See application file for complete search history.

(56) References Cited

U.S. PATENT DOCUMENTS

| | | |
|---|---|---|
| 8,752,761 B2 | 6/2014 | Calvaresse et al. |
| 8,938,257 B2 | 1/2015 | Chao et al. |
| 9,140,555 B1 | 9/2015 | Andersson et al. |

(Continued)

FOREIGN PATENT DOCUMENTS

| | | |
|---|---|---|
| DE | 102012101513 A1 | 8/2013 |
| EP | 1843292 A1 | 10/2007 |

(Continued)

OTHER PUBLICATIONS

Williams et al.: "Simultaneous Localisation and Mapping Using a Single Camera", Robotics Research Group of Engineering Science University of Oxford, 2009 Department.

(Continued)

Primary Examiner — Mazda Sabouri
(74) Attorney, Agent, or Firm — Rowand LLP

(57) ABSTRACT

A method for estimating the location of a mobile device in an indoor facility is disclosed. The method includes receiving a first sequence of image frames captured by a first camera, the first sequence of image frames being captured when the first camera is substantially faced toward a ceiling of the indoor facility; for each pair of consecutive image frames in the first sequence: identifying a transformation between the pair of image frames, and correlating the transformation with an estimated change in position of the mobile device; obtaining a first sequence of displacements based on the estimated changes in position of the mobile device for the pairs of consecutive image frames in the first sequence; and determining the current location of the mobile device within the indoor facility based on an initial location of the mobile device and the first sequence of displacements.

20 Claims, 6 Drawing Sheets

(56) References Cited

U.S. PATENT DOCUMENTS

| | | | |
|---|---|---|---|
| 2007/0152057 A1* | 7/2007 | Cato | G01S 17/48 235/462.01 |
| 2009/0316951 A1* | 12/2009 | Soderstrom | G06F 17/30241 382/103 |
| 2013/0045751 A1* | 2/2013 | Chao | G01C 21/206 455/456.1 |
| 2013/0194392 A1* | 8/2013 | Qi | H04N 13/0207 348/50 |
| 2015/0049170 A1* | 2/2015 | Kapadia | G06T 17/00 348/46 |
| 2015/0127259 A1 | 5/2015 | Kazemipur et al. | |
| 2015/0186018 A1 | 7/2015 | Hesch et al. | |
| 2015/0350846 A1* | 12/2015 | Chen | H04W 4/04 455/456.1 |
| 2017/0039445 A1* | 2/2017 | Tredoux | G06K 9/4671 |

FOREIGN PATENT DOCUMENTS

| | | |
|---|---|---|
| EP | 2503288 A2 | 9/2012 |
| WO | 2015083150 A1 | 6/2015 |

OTHER PUBLICATIONS

EPO, Extended European Search Report relating to EP application No. 16194543.1, dated Mar. 31, 2017.

EPO, EP Office Action relating to EP application No. 16194543.1, dated Feb. 15, 2018.

\* cited by examiner

UTILIZING CAMERA TO ASSIST WITH INDOOR PEDESTRIAN NAVIGATION

TECHNICAL FIELD

The present disclosure relates to indoor localization and, in particular, to navigating in an indoor facility based on tracking the location of a mobile device.

BACKGROUND

Indoor positioning systems are widely used to locate objects and people in indoor environments. As global navigation satellite systems (GPS or GNSS) are generally not suitable for indoor locations, various techniques relying on wireless infrastructure installed indoors have been developed. For example, Wi-Fi positioning systems include wireless access points (APs) distributed throughout an indoor facility and employ maps of received signal strength (RSS) fingerprints for location determinations. Other techniques based on Bluetooth and radio frequency identification (RFID) technologies can be found in commercial implementations of indoor positioning systems.

Accurate indoor localization can facilitate navigation in indoor environments. In particular, where the structural layout (e.g. two- or three-dimensional maps) of an indoor facility can be obtained, positioning information can be combined with structural details of the facility to provide navigation or routing information. For example, a mobile device capable of implementing indoor localization may allow transitioning from navigating outdoors (e.g. via use of GPS) to navigating inside a building.

Indoor positioning systems often require installing additional hardware infrastructure, which can be expensive and cumbersome. A lightweight method for navigating using a mobile device would be desirable.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
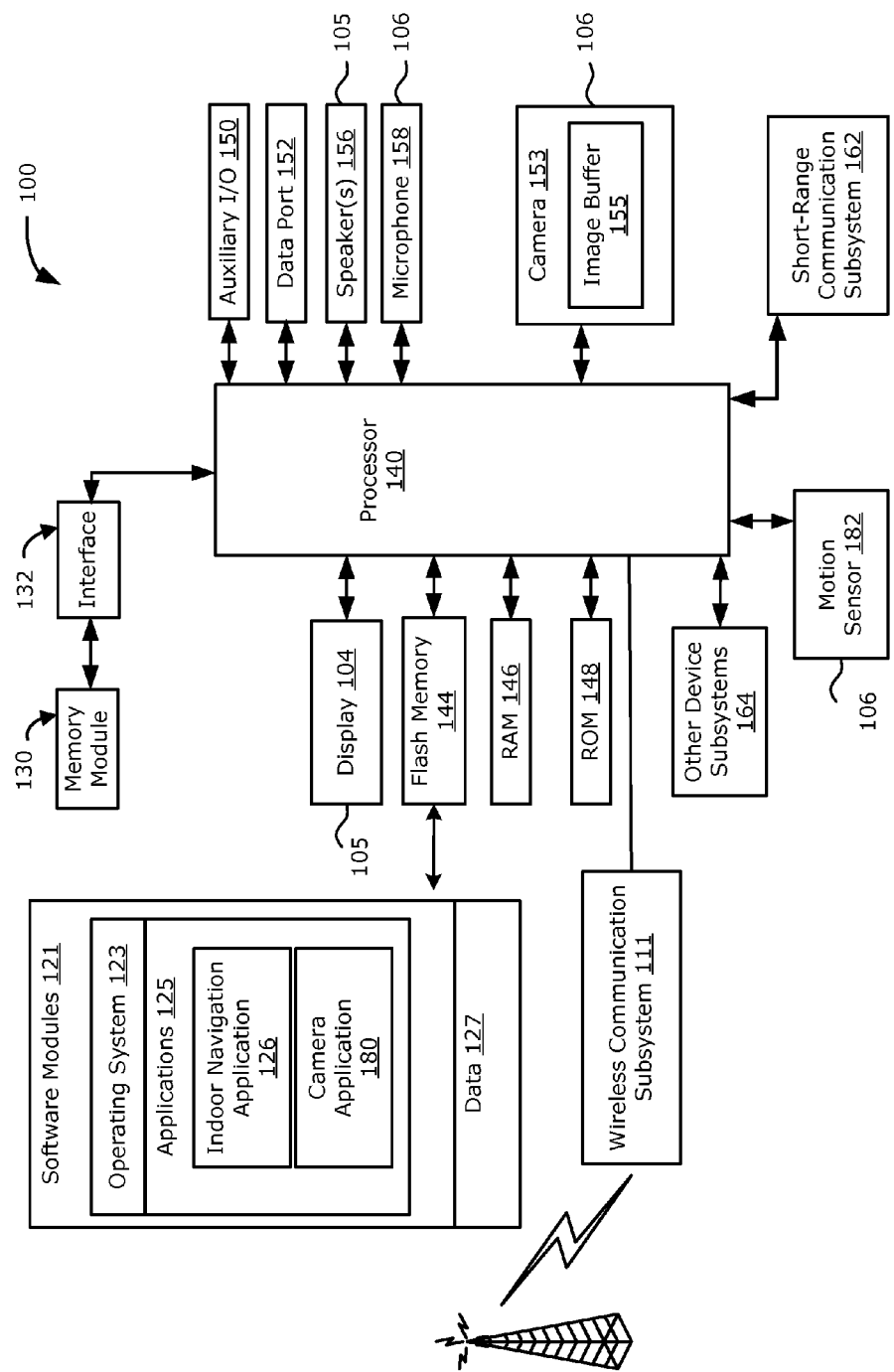
FIG. 1 is a block diagram illustrating components of an example mobile electronic device in accordance with example embodiments of the present disclosure.

In one aspect, the present application describes a camera-assisted technique for navigating within an indoor environment. More specifically, image data captured by one or more cameras of a mobile device may be used to determine a probable location and a direction of movement of the mobile device in an indoor facility. A sequence of consecutive images of ambient structural features in an indoor facility may be captured and analyzed to determine the transformations between consecutive image pairs. The changes in position of the mobile device represented by the sequence of transformations between image pairs can be combined with knowledge of the structural layout of the indoor facility to estimate a current location of the mobile device.

In one aspect, the present application describes a method for estimating a current location of a mobile device within an indoor facility, the mobile device having a first camera mounted on a first side of the mobile device. A first sequence of image frames captured by the first camera is received by the mobile device, the first sequence of image frames being captured when the first camera is substantially faced toward a ceiling of the indoor facility. For each pair of consecutive image frames in the first sequence, the mobile device identifies a transformation between the pair of image frames, and correlates the transformation with an estimated change in position of the mobile device. A first sequence of displacements is obtained based on the estimated changes in position of the mobile device for the pairs of consecutive image frames in the first sequence. The current location of the mobile device within the indoor facility may then be determined based on an initial location of the mobile device and the first sequence of displacements.

In another aspect, the present application describes a mobile electronic device. The mobile device includes a memory and a first camera on a first side of the mobile device. The mobile device also includes a processor coupled to the memory and the first camera. The processor is configured to receive a first sequence of image frames captured by the first camera, where the first sequence of image frames is captured when the first camera is substantially faced toward a ceiling of the indoor facility. For each pair of consecutive image frames in the first sequence, the processor is configured to identify a transformation between the pair of image frames and correlate the transformation with an estimated change in position of the mobile device. The processor is further configured to obtain a first sequence of displacements based on the estimated changes in position of the mobile device for the pairs of consecutive image frames in the first sequence and determine the current location of the mobile device within the indoor facility based on an initial location of the mobile device and the first sequence of displacements.

In yet another aspect, the present application describes a method for navigating within an indoor facility using a mobile device, the mobile device having a first camera mounted on a first side of the mobile device. A first sequence of image frames captured by the first camera is received by the mobile device, the first sequence of image frames being captured when the first camera is substantially faced toward a ceiling of the indoor facility. For each pair of consecutive image frames in the first sequence, the mobile device identifies a transformation between the pair of image frames, and correlates the transformation with a first estimated direction of motion of the mobile device during a time interval between capture times of the pair of image frames. Motion data from one or more sensors associated with the mobile device is also obtained, the motion data indicating a second estimated direction of motion of the mobile device during the time interval. A direction of motion of the mobile device during the time interval is determined based on at least one of the first estimated direction and the second estimated direction. A trajectory of the mobile device within the indoor facility corresponding to the first sequence of images is then determined based on a sequence of the determined directions of motion for the pairs of consecutive image frames in the first sequence.

Other example embodiments of the present disclosure will be apparent to those of ordinary skill in the art from a review of the following detailed descriptions in conjunction with the drawings.

In the present application, the term "and/or" is intended to cover all possible combination and sub-combinations of the listed elements, including any one of the listed elements alone, any sub-combination, or all of the elements, and without necessarily including additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern mobile devices, such as smartphones, are often equipped with a Global Positioning System (GPS) receiver chip and antenna which enable a mobile device to determine its location using broadcast signals received from four or more satellites. While GPS functionalities in mobile devices may provide reasonably accurate location information when there is an unobstructed line of sight to four or more GPS satellites, GPS may not be suitable for use in an indoor setting, as signals from satellites may be attenuated and scattered by roofs, walls or other interior features. In particular, indoor navigation relying on integrated GPS capability of a mobile device may not achieve a sufficient level of accuracy to be useful.

The use of a mobile device as an aid for navigating in an indoor environment can be valuable. A map or floor plan of a facility may often not be available. In some cases, a facility may comprise an expansive and complicated physical layout that is difficult to navigate even with the assistance of an indoor map. A mobile device may store detailed layout information for a plurality of facilities and provide real-time estimates of a current location as well as appropriate routing information.

The present application proposes an indoor navigation solution that relies on using the camera of a mobile device during navigation using the device. In particular, the movement of the mobile device relative to the ambient indoor environment is inferred based on images captured by the camera of the device. The trajectory of device movement can be combined with the physical layout information for an indoor facility to derive real-time estimates of the current location of the mobile device.

Example Mobile Device

Reference is first made to FIG. 1, which shows an example mobile device 100 in accordance with example embodiments of the present application. In the example embodiment illustrated, the mobile device 100 is a communication device, such as a smartphone, that is configured to communicate with other electronic devices, servers and/or systems. The mobile device 100 is portable and may be easily moved between different physical locations.

Depending on the functionality provided by the mobile device 100, in various example embodiments, the mobile device 100 may be a multiple-mode communication device configured for both data and voice communication, a mobile telephone such as a smartphone, a wearable computer such as a watch, a tablet computer such as a slate computer, a personal digital assistant (PDA), or a computer system. The mobile device 100 may take other forms apart from those specifically listed above.

The mobile device 100 includes a housing, for housing the components of the mobile device 100. The internal components of the mobile device 100 are constructed on a printed circuit board (PCB). The mobile device 100 includes a controller including at least one processor 140 (such as a microprocessor) which controls the overall operation of the mobile device 100. The processor 140 interacts with device subsystems such as a wireless communication subsystem 111 for exchanging radio frequency signals with a wireless network to perform communication functions. The processor 140 may be communicably coupled with additional device subsystems including one or more output interfaces 105 (such as a display 104 and/or a speaker 156), one or more input interfaces 106 (such as a camera module 153, a microphone 158, a motion sensor 182, a keyboard (not shown), control buttons (not shown), a touch-sensitive overlay (not shown) associated with a touchscreen display and/or other input interfaces 106), memory (such as flash memory 144, random access memory (RAM) 146, read only memory (ROM) 148, etc.), auxiliary input/output (I/O) subsystems 150, a data port 152 (which may be a serial data port, such as a Universal Serial Bus (USB) data port), a short-range communication subsystem 162 and other device subsystems generally designated as 164. Some of the subsystems shown in FIG. 1 perform communication-related functions, whereas other subsystems may provide "resident" or on-device functions.

In at least some example embodiments, the mobile device 100 may include a touchscreen display which acts as both an input interface 106 (i.e. touch-sensitive overlay) and an output interface 105 (i.e. display 104). The touchscreen display may be constructed using a touch-sensitive input surface which is connected to an electronic controller and which overlays the display 104. The touch-sensitive overlay and the electronic controller provide a touch-sensitive input interface 106 and the processor 140 interacts with the touch-sensitive overlay via the electronic controller.

In at least some example embodiments, the mobile device 100 also includes a removable memory module 130 (which may be flash memory, such as a removable memory card) and a memory interface 132. Network access may be associated with a subscriber or user of the mobile device 100 via the memory module 130, which may be a Subscriber Identity Module (SIM) card for use in a GSM network or other type of memory card for use in the relevant wireless network type. The memory module 130 is inserted in or connected to the memory interface 132 of the mobile device 100 in order to operate in conjunction with a wireless network.

The data port 152 may be used for synchronization with a user's host computer system (not shown). The data port 152 enables a user to set preferences through an external device or software application and extends the capabilities of the mobile device 100 by providing for information or software downloads to the mobile device 100 other than through the wireless network. The alternate download path may for example, be used to load an encryption key onto the mobile device 100 through a direct, reliable and trusted connection to thereby provide secure device communication.

The mobile device 100 includes a camera module 153. The camera module 153 is capable of capturing camera data, such as images (in which case the camera data may be referred to as image data), in the form of still photo and/or motion data. The camera data may be captured in the form of an electronic signal which is produced by an image sensor associated with the camera module 153.

The camera module 153 may include various components that assist in the capturing of images. For example, the camera module 153 may include an image sensor, one or more lens elements, a shutter, an infrared (IR) cut-off filter, a storage card, etc. In at least some example embodiments, the camera module 153 may additionally include an image buffer 155.

The image buffer 155 is provided in memory (for example, RAM) which temporarily stores image data of a captured image prior to the image being processed and/or stored in memory (for example, the flash memory 144) of the mobile device 100. That is, the image buffer 155 temporarily holds the image data before it is written out to the permanent memory of the mobile device 100.

In at least some example embodiments, the image buffer 155 may allow for a burst operating mode of the camera module 153. That is, the camera module 153 may allow capture of a number of consecutive images for each camera module 153 trigger (i.e. for each shutter release input). The number of consecutive images captured may depend upon the capacity of the associated image buffer 155 which temporarily stores the consecutive images. In at least some example embodiments, the number of consecutive images captured by the camera module 153 on the image buffer 155 may be varied. That is, the capacity of the image buffer 155 may be of a variable length (as opposed to a fixed length), and its capacity may be manipulated to control the number of consecutive images captured for storage.

In the illustrated example, the image buffer 155 is shown as part of the camera module 153. However, in at least some example embodiments, it will be appreciated that the image buffer 155 may not be included within the camera module 153. For example, the image buffer 155 may be a stand-alone component or part of the RAM 146 of the mobile device 100.

The camera module 153 may be configured as a front facing camera or a rear facing camera. A front facing camera is provided by a camera module 153 which is located to obtain images near a front face of the mobile device 100. The front face is typically the face on which a main display 104 is mounted. That is, when a front facing camera is provided on the mobile device 100, the display 104 is configured to display content which may be viewed from a side of the mobile device 100 where the camera module 153 is directed.

The camera module 153 of the front facing camera may be located above or below the display 104. In at least some example embodiments, the camera module 153 may be provided in a central location relative to the display 104 to facilitate image acquisition of a face. For example, the camera module 153 may be located centrally above the display 104.

A rear facing camera is provided by a camera module 153 which is located to obtain images of a subject near a rear side of the mobile device 100. The rear side is typically a side which does not include the main display 104 of the mobile device 100. In at least some embodiments, the display 104 of the mobile device 100 may act as a viewfinder displaying image data associated with a rear facing camera. In such example embodiments, the mobile device 100 may include various operating modes for the viewfinder (for example, in one operating mode, the mobile device 100 provides a wallpaper viewfinder).

The rear facing camera may obtain images which are not within the field of view of the front facing camera. The field of view of the front facing and rear facing cameras may generally be in opposing directions.

While FIG. 1 illustrates a single camera module 153, the mobile device 100 may include a plurality of camera modules 153. For example, in at least some example embodiments, the mobile device 100 may include both a front facing camera and a rear facing camera.

In at least some example embodiments, the mobile device 100 may include one or more sensors. For example, the mobile device 100 may include a motion sensor 182 that detects motion (i.e. movements) of the mobile device 100 or that generates information from which the motion of the mobile device 100 can be determined. For example, in at least some example embodiments, the motion sensor 182 may include a gyroscope (such as a three-axis gyroscope). A gyroscope is a sensor that measures the rotational velocity of the mobile device 100. That is, the gyroscope may generate an output which specifies the rotational rate of the mobile device 100. For example, the gyroscope may define one or more sensing axes, and motion at each of the one or more sensing axis may be measured as a rotation per unit of time, irrespective of the other sensing axis. Accordingly, the gyroscope may generate motion data associated with movements of the mobile device 100.

In at least some example embodiments, the motion sensor 182 includes an accelerometer (such as a three-axis accelerometer). An accelerometer is a sensor that measures the acceleration of the mobile device 100. That is, the accelerometer may generate an output which specifies the magnitude and/or direction of acceleration of the mobile device 100. The accelerometer converts acceleration from motion (of the mobile device 100) and gravity which are detected by a sensing element into a corresponding output signal. Accordingly, the accelerometer may be utilized to detect motion of the mobile device 100, and generate motion data associated with movements of the mobile device 100.

In at least some example embodiments, the motion sensor 182 may be of other forms and/or a combination of sensors.

As mentioned above, the motion sensor 182 may generate motion data which quantifies and/or identifies the motion of the mobile device 100. The motion data, in at least some example embodiments, specifies the motion of the mobile device 100 relative to the earth. The obtained motion data may be utilized for various purposes, including configuring functions and features of the mobile device 100. For example, the measurements of the accelerometer and/or gyroscope may provide orientation of the mobile device 100. That is, the accelerometer and/or gyroscope may generate orientation data that specifies the orientation of the mobile device 100. Such orientation data may, for example, be used to influence the operation of the mobile device 100. For example, the mobile device 100 may switch between a portrait operating mode and a landscape operating mode based on the orientation data.

The mobile device 100 stores data 127 in an erasable persistent memory, which in one example embodiment is the flash memory 144. In various example embodiments, the data 127 includes service data including information used by the mobile device 100 to establish and maintain communication with a wireless network. The data 127 may also include user application data such as email messages, address book and contact information, image data, calendar and schedule information, notepad documents, image files, and other commonly stored user information stored on the mobile device 100 by its user, and other data. The data 127 stored in the persistent memory (e.g. flash memory 144) of the mobile device 100 may be organized, at least partially, into one or more databases or data stores. The databases or data stores may contain data items of the same data type or associated with the same application. For example, email messages, contact records, and task items may be stored in individual databases within the memory.

The mobile device 100, in at least some example embodiments, may be a mobile communication device providing two principal modes of communication: a data communication mode and a voice communication mode. In the data communication mode, a received data signal such as a text message, an email message, or a web page download are processed by the wireless communication subsystem 111 and input to the processor 140 for further processing. For example, a downloaded web page may be further processed by a browser application or an email message may be processed by an email messaging application and output to the display 104. A user of the mobile device 100 may also compose data items, such as email messages, for example, using the input devices in conjunction with the display 104. These composed items may be transmitted through the wireless communication subsystem 111 over a wireless network.

In the voice communication mode, the mobile device 100 provides telephony functions and operates as a typical cellular phone. The overall operation is similar to the data communication mode, except that the received signals would be output to the speaker 156 and signals for transmission would be generated by a transducer such as the microphone 158. The telephony functions are provided by a combination of software/firmware (e.g., a voice communication module) and hardware (e.g., the microphone 158, the speaker 156 and input interfaces 106). Alternative voice or audio I/O subsystems, such as a voice message recording subsystem, may also be implemented on the mobile device 100. Although voice or audio signal output is typically accomplished primarily through the speaker 156, the display 104 may also be used to provide an indication of the identity of a calling party, duration of a voice call, or other voice call related information.

The processor 140 operates under stored program control and executes software modules 121 stored in memory such as persistent memory; for example, in the flash memory 144. As illustrated in FIG. 1, the software modules 121 include operating system 123 software and other software applications 125.

The software applications 125 may include an indoor navigation application 126. The indoor navigation application 126 is suitable for use in indoor settings such as inside multi-storey buildings, conference centers, industrial sites (such as manufacturing plants), etc. In at least some embodiments, the indoor navigation application 126 may be used for determining the current location of the mobile device 100 within an indoor facility. For example, the indoor navigation application 126 may generate a user interface for displaying the location of the mobile device 100 on the display 104. The indoor navigation application 126 may also track the trajectory of the mobile device 100 in the indoor facility and provide routing information for the device user. One or more indoor maps or floor plans may be loaded into the indoor navigation application 126, for example, by downloading from a remote source (e.g. Internet). In some embodiments, maps and floor plans corresponding to a plurality of indoor facilities may be organized into databases stored in memory of the mobile device 100. Based on the indoor maps, floor plans or other sources of information regarding the structural layout of a facility, the indoor navigation application 126 may cause a map interface to be displayed on the display 104. The current location and/or trajectory of the mobile device 100 may be visually represented in the map interface, either automatically upon opening the indoor navigation application 106 or in response to receiving further input from the device user.

The indoor navigation application 126 may present various interactive options for the device user. For example, the indoor navigation application 126 may allow the device user to select an initial location from which to start navigation, a desired destination within facility and navigation modes (e.g. predictive routing). The indoor navigation application 126 may provide routing information during navigation, in real-time, either in a graphical map interface, as a sequence of textual instructions output to the display 104, or as audible voice instructions. Additionally, the device user may scroll through the map interface of the indoor navigation application 126 and manually correct the device location and/or trajectory information displayed on the map interface.

The software applications 125 on the mobile device 100 may also include a range of additional applications including, for example, a notepad application, Internet browser application, voice communication (e.g. telephony) application, mapping application, or a media player application, or any combination thereof. Each of the software applications 125 may include layout information defining the placement of particular fields and graphic elements (e.g. text fields, input fields, icons, etc.) in the user interface (e.g. the display 104) according to the application.

The software modules 121 or parts thereof may be temporarily loaded into volatile memory such as the RAM 146. The RAM 146 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications may be installed on the mobile device 100 during or after manufacture. Additional applications and/or upgrades to the operating system 123 or software applications 125 may also be loaded onto the mobile device 100 through a wireless network, the auxiliary I/O subsystem 150, the data port 152, the short-range communication subsystem 162, or other suitable device subsystem 164. The downloaded programs or code modules may be permanently installed, for example, written into the program memory (i.e. the flash memory 144), or written into and executed from the RAM 146 for execution by the processor 140 at runtime.

The processor 140 may be electrically connected to the camera module 153 to allow the processor 240 to receive electronic signals representing camera data from the camera module 153 including the image buffer 155.

In at least some example embodiments, a camera application 180 may associate captured images with motion data representing the amount of motion occurring at the mobile device 100 when each of the images was captured. The camera application 180 may then determine whether the amount of motion exceeds a threshold based on the motion data associated with each of the captured images. Images that are captured when the amount of motion of the mobile device 100 exceeds the threshold may be discarded, while images that are captured when the amount of motion of the mobile device 100 is below the threshold may be maintained. That is, if the motion data indicates that excessive motion occurred when the image was captured, the mobile device 100 may determine that the quality of the image is likely to be poor and discard the image.

As noted above, in the burst operating mode, a plurality of images may be captured in response to a single input instructing the mobile device 100 to capture an image (e.g. a single shutter release input may cause a plurality of images to be captured consecutively). In at least some example embodiments, in the burst operating mode, the camera application 180 may manipulate the number of consecutive images captured by the camera module 153. For example, the camera application 180 may obtain motion data from the motion sensor 182, and control the number of consecutive images captured by the camera module 153 based on the motion data, when the camera module 153 is triggered. For example, in such example embodiments, the camera application 180 may determine whether the motion of the mobile device 100 is greater than or less than a pre-determined threshold. When the motion is greater than the pre-determined threshold, the camera application 180 may increase the number of consecutive images captured by the camera module 153 for each trigger; and when the motion is less than the pre-determined threshold, the camera application 180 may decrease the number of consecutive images captured by the camera module 153 for each trigger.

While the embodiment discussed above includes a processor 140 coupled with a camera application 180 which collectively act as an image signal processor to provide image related functions such as focusing, in other example embodiments (not shown), another processor such as a dedicated image signal processor, may provide some or all of these functions.

In at least some example embodiments, the operating system 123 may perform some or all of the functions of the camera application 180. In other example embodiments, the functions or a portion of the functions of the camera application 180 may be performed by one or more other applications.

Further, while the camera application 180 has been illustrated as a stand-alone application, in other example embodiments, the camera application 180 may be implemented as part of the operating system 123 or another application 125. For example, the camera application 180 may be used in conjunction with or as part of the operation of the indoor navigation application 126. Furthermore, in at least some example embodiments, the functions of the camera application 180 may be provided by a plurality of software modules. In at least some example embodiments, these software modules may be divided among multiple applications.

Determining Location of Mobile Device

Figure 2:
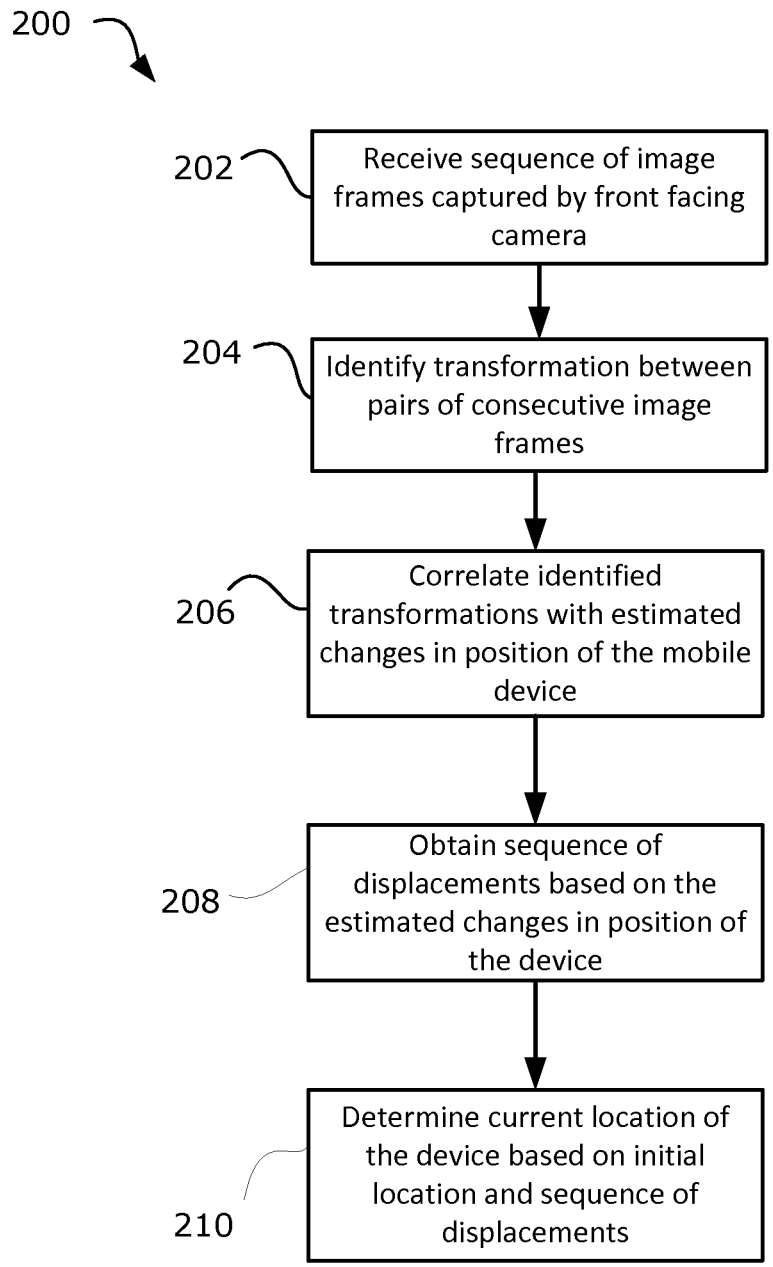
FIG. 2 shows, in flowchart form, an example method for determining a current location of a mobile device within an indoor facility.

Reference is now made to FIG. 2, which shows, in flowchart form, an example method 200 for determining the current location of a mobile device in an indoor facility. In at least some embodiments, the method 200 may be implemented by a processor of a mobile device, such as mobile device 100 shown in FIG. 1. The method 200 may be employed in various contexts. For example, a user of a mobile device may access an indoor navigation application on the device to determine her estimated location within an indoor facility, map a route for a trip in the facility, or receive instructions for navigating towards a desired destination. As another example, the method 200 may be performed to generate and continuously update employee and/or managed device location data within an indoor facility. Other applications of the method 200 may be available.

In operation 202, the mobile device receives a first sequence of image frames captured by a first camera of the mobile device. The first camera is a front facing camera mounted on the front face of the mobile device. In at least some embodiments, the processor of the mobile device may trigger the capture of image frames by the first camera. For example, in some cases, consecutive image frames may be continuously captured upon receiving a request from a device user via an indoor navigation application on the device. In some other cases, a sequence of image frames may be automatically captured and stored in memory when the device detects that it is located indoors.

The first sequence of image frames is captured when the first camera is substantially faced toward a ceiling of the indoor facility. In particular, the first camera is used to capture images of the ceiling during navigation. As both the first camera and the device display are positioned on the front face of the mobile device, the device user may hold the device directly out in front of her and maintain the device in a relatively flat position in order to facilitate image capture by the first camera and to view the display of any graphical user interfaces associated with the indoor navigation application. In some embodiments, the indoor navigation application may provide instructions to the device user to orient the device such that the front face of the camera faces upward and request confirmation that the device has been so oriented, prior to starting navigation. The device user may also be prompted to orient the device such that the top edge of the device faces forward when the device is held by the device user during navigation. In this way, the device orientation relative to the device user can be maintained relatively fixed so that movement of the mobile device with respect to the ambient indoor environment during navigation substantially corresponds with movement of the device user. One or more motion sensors on the device, such as an accelerometer or gyroscope, may be employed to verify that the device is properly oriented. In some embodiments, the motion sensors may also be used to compensate for improper or unstable device orientation during navigation.

At the start of navigation, an initial location associated with the mobile device is determined. In some cases, the initial location may default to the location at which the capture of image frames was first initiated. For example, the initial location may be the location in the indoor facility where the device user first accessed the indoor navigation application to request device location information. In some other cases, the initial location may be explicitly specified by the device user. The device user may indicate the initial location on a graphical user interface associated with the indoor navigation application or identify one or more known landmarks in her vicinity from which the navigation can proceed.

In at least some embodiments, the first sequence of image frames may be automatically captured by the first camera at predetermined fixed time intervals. The first camera may capture the image frames in real-time at regular intervals as the device user moves through the indoor facility. For example, the first camera may capture an image every 1 second during user's motion. In some other embodiments, the first sequence of images may be captured at a rate that depends on the relative speed of movement of the device user. By way of example, if the motion data associated with the mobile device indicates that the device is moving at a speed exceeding a predefined threshold, the frequency of image capture by the first camera may be increased accordingly. Similarly, if the speed of movement of the mobile device is determined to fall below a predefined threshold, the rate of capture of images may be decreased.

Each image frame captured by the first camera may be timestamped, preferably with high precision. Additionally, for each captured image frame, an accelerometer reading associated with the image frame may be determined. The accelerometer reading may be obtained by an accelerometer of the device at the time of capturing the image frame. As will be described in greater detail below, the accelerometer reading may be used to determine a tilt of the mobile device relative to the ceiling of the indoor facility when the image frame was captured. Other motion sensor readings (e.g. gyroscope, magnetometer, etc.) may be obtained and associated with corresponding image frames.

For each pair of consecutive image frames in the first sequence of image frames captured by the first camera, the mobile device identifies a transformation between the pair of image frames in operation 204. The transformation may be a translation, a rotation or a combination of one or more translations and rotations. Assuming proper orientation of the mobile device during navigation, a translation between image frames may indicate rectilinear motion while a rotation may result from one or more changes in direction of motion (e.g. turns). In at least some embodiments, the transformation between consecutive image frames may be identified based on analysis of sampled pixels from the image frames. For example, an appropriate block matching algorithm may be employed to identify the transformations. In some cases, the identification of transformations may be aided by detection of indoor landmarks/markers and/or predominant features or visible patterns on ceilings.

In operation 206, the identified transformation for an image frame pair is correlated with an estimated change in position of the mobile device. For example, a turning motion of the mobile device may be correlated to a detected rotation between consecutive image frames while a forward or lateral motion of the mobile device may be deduced from a detected translation. In at least some embodiments, estimates of more precise information, such as angle of turn or distance moved, may be derived from the identified transformations between image frames.

In order to obtain accurate values of turn angles and distances, an appropriate scaling of the transformations may be required. Such scaling may be based on approximating the distance of the mobile device from the ceiling of the indoor facility. In particular, the mobile device may be calibrated with the ceiling height either prior to or while navigating using the mobile device. For example, before beginning navigation, the device user may be instructed to use the first camera to take a series of images of the ceiling of the facility while remaining in a stationary position. The images may be captured by the first camera while rotating the mobile device to a number of different orientations (e.g. different pitch, yaw and roll values) with respect to the ceiling. By tracking the angle changes of the device and the associated transformations, such as translations and rotations, in the image frames captured while the user is remaining relatively stationary, the distance between the device and the ceiling may be approximated. This approximated distance can serve as a basis for determining the scaling factor between an identified transformation for a pair of consecutive image frames of the first sequence and the corresponding estimate of change in position of the mobile device.

In operation 208, the mobile device obtains a sequence of displacements based on the estimated changes in position of the mobile device for pairs of consecutive image frames in the first sequence. In particular, the changes in position of the device attributable to identified transformations between consecutive image frames may be "pieced together" and organized into an ordered sequence of displacements. This sequence of displacements can serve as a representation of the trajectory of the mobile device within the indoor facility. In at least some embodiments, when obtaining the sequence of displacements, the mobile device may access image frames data for the first sequence as well as the structural layout of the facility to account for various possible sources of error, such as improper device orientation, unnavigable routes, changes in height of the device during motion, discrepancies in scaling factors, etc.

The current location of the mobile device within the indoor facility may then be determined in operation 210, based on the initial location of the device and the obtained sequence of displacements. The indoor navigation application may determine the current location of the device with respect to a structural layout (e.g. map, floor plan, etc.) of the facility. Starting from the initial location of the device, the sequence of displacements can be applied/added to arrive at an estimate of the current location of the device. In at least some embodiments, the scale of the structural layout representation will need to be synchronized or reconciled with the scale for the sequence of displacements. Upon determining an estimate of the current location of the device, the indoor navigation application may provide navigation instructions, in real-time, to reach one or more specified destinations within the facility.

Figure 3:
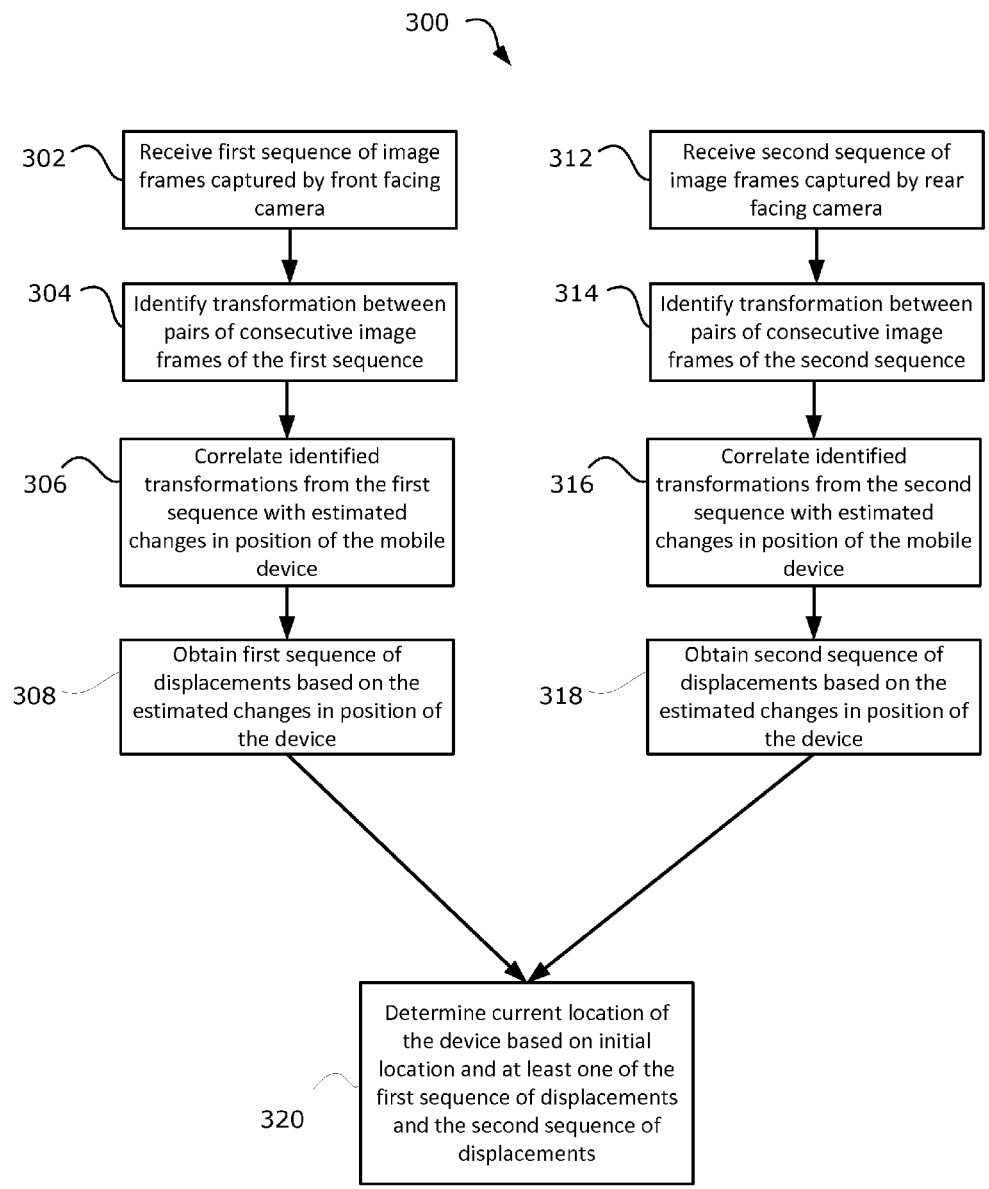
FIG. 3 shows, in flowchart form, another example method for determining a current location of a mobile device within an indoor facility.

Reference is now made to FIG. 3, which shows, in flowchart form, another example method 300 for determining the current location of a mobile device in an indoor facility. It should be noted that operations 302, 304, 306 and 308 correspond to operations 202, 204, 206 and 208 of the method 200 in FIG. 2. More specifically, the method 300 includes receiving a first sequence of image frames captured by a front facing camera and identifying transformations between pairs of consecutive image frames to obtain a first sequence of displacements of the mobile device.

In addition to using a front facing camera, the method 300 utilizes the capabilities of a rear facing camera on the mobile device. When navigating indoors using the mobile device such that the front facing camera is substantially faced toward the ceiling, the rear facing camera will be directed toward the ground. In operation 312, the mobile device receives a second sequence of image frames captured by the rear facing camera. Specifically, the image frames of the second sequence will depict the floor of the facility during navigation. In at least some embodiments, the image frames of the second sequence may be captured at the same time as corresponding image frames from the first sequence. That is, the front and rear facing cameras may take images of the ceiling and floor of the facility, respectively, as the device user navigates using the mobile device. In some other embodiments, the image frames of the first and second sequences may be taken at different times. For example, the image frames of the respective sequences may be captured at different time intervals (e.g. two images from the rear facing camera for every one image from the front facing camera). Different temporal relationships between capture times of the images of the first sequence and the second sequence may be employed in other embodiments.

As was done for the first sequence of image frames captured by the front facing camera, for each pair of consecutive image frames in the second sequence, the mobile device identifies a transformation (e.g. a translation, a rotation, or a combination of one or more translations and rotations) between the image frames, in operation 314. In a similar manner as for the front facing camera, the mobile device may be calibrated to derive an estimate of the distance between the mobile device and the floor of the facility using the rear facing camera while the device user remains relatively stationary. The estimated distance can be a basis for a scale factor for image frames obtained from the rear facing camera during navigation. The identified transformation between the consecutive image frames is correlated with an estimated change in position of the mobile device in operation 316. The mobile device may then obtain, at operation 318, a second sequence of displacements, based on the estimated changes in position of the mobile device for the pairs of consecutive image frames in the second sequence.

The use of one or two cameras during navigation provides the luxury of relying on image frames captured by either one or both of the cameras for obtaining the sequence of displacements of the mobile device. In particular, in operation 320, the current location of the mobile device may be determined based on an initial location of the device and at least one of the first sequence of displacements and the second sequence of displacements. There may be certain situations when use of only one of the two cameras may be desirable. For example, one of the cameras may not be available for use during navigation. As another example, the cameras may be affected by different imaging environments (e.g. lighting conditions) or the cameras may have different technical specifications, such as image quality, level of zoom, etc. As a further example, the ceiling or the floor of the indoor facility may not have a sufficient number of identifiable features, rendering the analysis of image frames from one of the front and rear facing cameras to be ineffective for navigation. In at least some embodiments, the device user may select to use one or both of the cameras of the mobile device during navigation. By way of example, if the device user notices that the floor of the facility is carpeted or tiled such that discerning identifiable features from images of the floor may be difficult, she may opt to forgo using the rear facing camera. In some embodiments, analysis of the image frames captured by one or both of the front facing camera and the rear facing camera may indicate that there are insufficient identifiable features in the captured images for determining transformations between consecutive image frames. For example, an analysis of one or more images captured by the rear facing camera during navigation may indicate that the floor does not contain a sufficient number of distinguishable features or that minimal or no changes are detected between a plurality of consecutive images. In such cases, the mobile device may be configured to automatically turn off the front facing or rear facing camera and/or discontinue its use for the purpose of navigation in the indoor facility.

Using Motion Sensors During Navigation

Motion sensors on a mobile device may be useful in determining speed, direction and/or orientation of the device during indoor navigation. One potential pitfall associated with relying entirely on motion sensors for navigation is that the sensors can accumulate significant errors over time, which can render their use in navigation futile. The motion sensors may not usually be calibrated before use for navigation and accumulated errors without intermittent corrections can result in flawed indications from sensor readings. Images of an ambient indoor environment, on the other hand, inherently rely on depicted scenes of the external environment (e.g. patterns on ceilings/floors, indoor landmarks, etc.), which are independent of errors that may be attributable to the mobile device or the sensors contained in the device. By combining the use of motion sensors with the technique of capturing images of an ambient indoor environment, the value of motion sensors for navigation may be realized while being able to detect and correct for potential errors in sensor readings.

Figure 4:
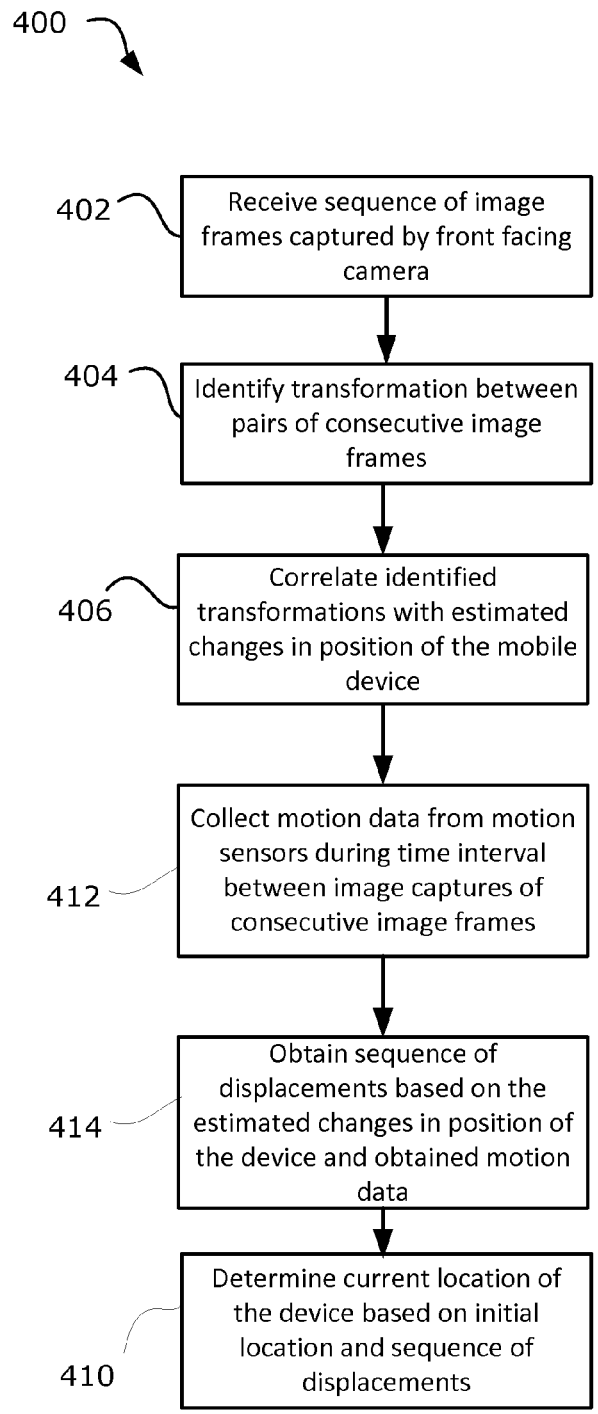
FIG. 4 shows, in flowchart form, another example method for determining a current location of a mobile device within an indoor facility.

Reference is now made to FIG. 4, which shows, in flowchart form, an example method 400 for determining the current location of a mobile device. Operations 402, 404, 406 and 410 of method 400 correspond to the operations 202, 204, 206 and 210 of method 200 shown in FIG. 2. In operation 412, the mobile device obtains, for each pair of consecutive image frames in the first sequence, motion data from one or more motion sensors associated with the mobile device. In particular, the motion data may indicate an estimated direction of motion of the mobile device during a time interval between capture times of each pair of consecutive image frames of the first sequence. That is, during the interval between two consecutive image captures, motion sensor data may be collected by the mobile device, indicating a direction of travel of the device/user.

In operation 414, the mobile device obtains a sequence of displacements based on the estimated changes in position of the mobile device derived from identifying transformations between consecutive image frames of the first sequence and the obtained motion data associated with the consecutive pairs of image frames. In other words, the mobile device uses the motion sensor data in combination with the analysis of image frame transformations in obtaining the sequence of device displacements within the indoor facility. In at least some embodiments, each displacement in the sequence of displacements may be obtained by weighting the estimated change in position of the mobile device (attributable to image frames analysis) and the motion data associated with a pair of consecutive image frames (attributable to motion sensor readings). By way of example, where motion sensor readings show large fluctuations in measured values during navigation or where the ambient indoor environment contains a large number of identifiable structural features, the estimated changes in position of the device obtained by identifying transformations between image frame pairs may be accorded greater weight than the direction of motion suggested by motion sensor readings, when deriving a displacement of the device. Conversely, where image frame analysis may not be reliable, for example, due to an absence of distinct structural features, motion sensor readings may be given greater weight in obtaining a displacement value for the device.

In at least some embodiments, the technique of indoor navigation using image frame analysis may supplement an inertial navigation system based on dead reckoning. Dead reckoning is a method of continuously tracking the position and/or orientation of a device relative to a known starting point, orientation and velocity. While dead reckoning may be a theoretically plausible technique for navigation, in practice, the motion sensors that are used on mobile devices can accumulate significant error and fail to provide reasonable estimates of location. One possible approach for addressing the problem of sensor reading errors in inertial navigation using a mobile device is to supplement motion data from the sensors with image data of the ambient indoor environment captured using cameras of the mobile device. For example, an image of the ceiling may be captured by the front facing camera of the mobile device at each time motion sensor readings are taken on the device. The changes in position of the mobile device estimated from transformations between consecutive image pairs may be compared with changes in position as indicated by motion sensor readings. In some embodiments, a displacement indicated by motion sensor readings may be corrected by replacing values that do not match the image frame analysis values with the displacement estimated from image frame transformations. In particular, where one or more anomalies are detected in motion sensor readings, the estimated changes in position of the mobile device derived from an image frame analysis may be favored when calculating displacements and location of the device.

Figure 5:
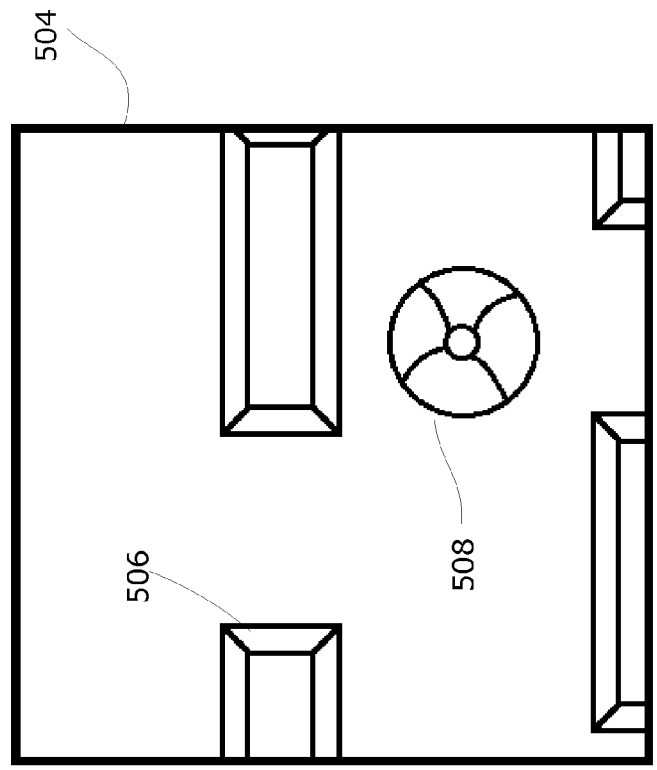
FIG. 5 shows an example pair of consecutively captured image frames captured by a front facing camera during navigation using the mobile device.
Figure 5:
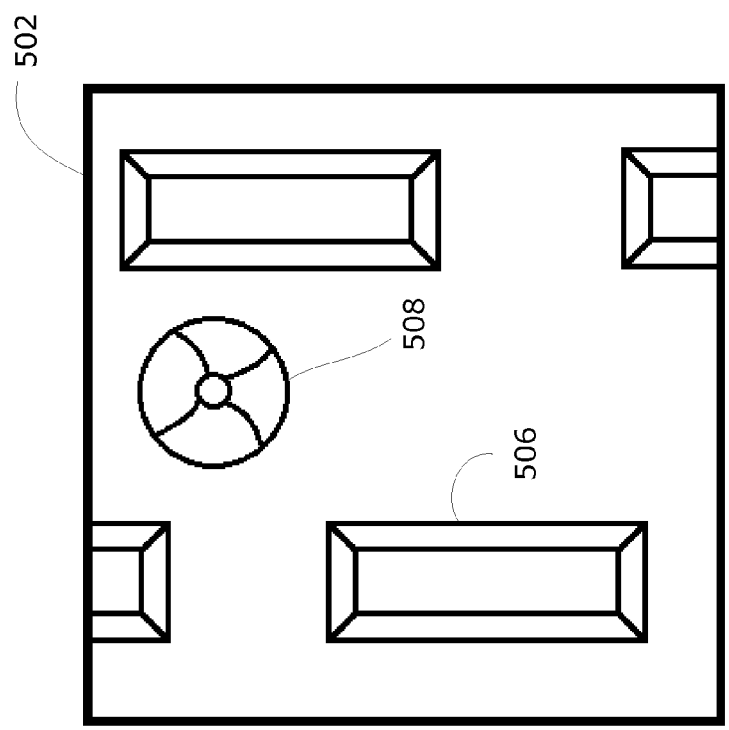

Reference is now made to FIG. 5, which shows an example pair of consecutive image frames 502 and 504 captured by a front facing camera of the mobile device during navigation within an indoor facility. Image frames 502 and 504 may be consecutive images captured by a mobile device during a forward motion of a user who holds the mobile device in front of her as she navigates the indoor facility. For example, image 502 may be an image captured by the front facing camera of the mobile device one second before the image 504 was captured by the same camera during the user's motion. As shown in FIG. 5, the ceiling may contain alternating patterns 506 and 508. That is, there may be a plurality of patterns 506 and 508 which alternate along the ceiling in a specific direction. In at least some embodiments, the patterns 506 and 508 may correspond to various ornamental features on the surface of the ceiling and/or functional elements attached to the ceiling (e.g. light fixtures).

As illustrated in the example of FIG. 5, images 502 and 504 may represent a change in position of the mobile device. More specifically, image 504 may correspond to a displacement of the mobile device from the position at which the image 502 was captured by the mobile device. In the example of FIG. 5, the image 504 represents both a translation and a rotation relative to the image 502. The translation and the rotation between the image frames 502 and 503 may, in turn, indicate a forward movement and rotation/turn of the mobile device, respectively. In some embodiments, a scale factor may be determined in order to estimate a relationship between the distance measurements in the image frames and actual distance travelled by the mobile device. Such use of a scaling factor may be particularly relevant in indoor environments with high ceilings; in such cases, due to the large object distance (i.e. distance between camera and ceiling), a small positional change between consecutive image frames of the ceiling may represent a large actual change in position of the mobile device. As detailed above, in some cases, a scaling factor may be determined based on an approximated distance/height between the mobile device and the ceiling. Therefore, in at least some embodiments, a scale factor may be applied to distance measurements (for translations) and angle measurements (for rotations) for the transformations between image frames in order to derive estimates of real-life displacements of the mobile device. By way of example, a one centimeter translation of an identifiable pattern (such as pattern 508) in consecutive image frames 502 and 503 may correspond to a translational (e.g. forward) movement of the mobile device of 2.5 meters, which may be determined according to a scale factor based on estimated distance of the ceiling from the mobile device.

Figure 6:
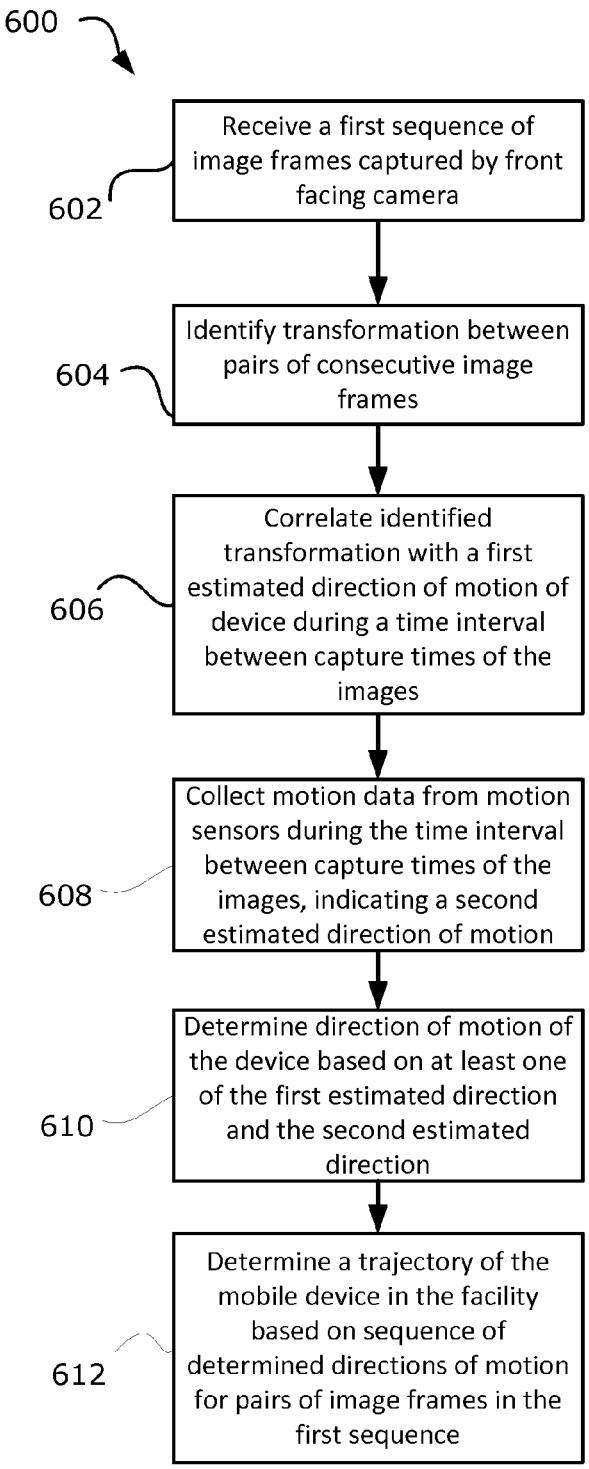
FIG. 6 shows, in flowchart form, an example method for navigating using a mobile device within an indoor facility.

Reference is now made to FIG. 6, which shows, in flowchart form, an example method 600 for navigating within an indoor facility using a mobile device. Operations 602 and 604 of method 600 correspond to the operations 202 and 204 of method 200 shown in FIG. 2. In operation 606, for each pair of consecutive image frames in the first sequence, the mobile device correlates the identified transformation between the pair of image frames with a first estimated direction of motion of the mobile device during a time interval between capture times of the pair of image frames. That is, the transformation between the image frames may indicate a first estimated direction in which the mobile device was travelling during the time interval between capturing the first of the pair of image frames and the second of the pair of image frames. For example, the transformation between the image frames may be correlated to a rotation of the mobile device by a 40 degree angle in the counter-clockwise direction. In operation 608, the mobile device obtains motion data from one or more motion sensors associated with the mobile device. In particular, the motion data may indicate a second estimated direction of motion of the mobile device during the time interval between captures times of the image frames. For example, the motion sensor data (from an accelerometer, a gyroscope, etc.) may indicate that the mobile device had undergone a rotation by a 70 degree angle in the counter-clockwise direction between the capture times of the consecutive image frames.

A direction of motion of the mobile device may then be determined in operation 610, based on at least one of the first estimated direction and the second estimated direction. In other words, the direction of motion of the mobile device is determined by considering one or both of the analysis of the transformation between consecutive image frames and the motion sensor data obtained by the mobile device. In at least some embodiments, the direction of motion may be calculated by weighting the first estimated direction and the second estimated direction. For example, if the direction of motion estimated based on image analysis of the image frames is determined to be more reliable than the direction of motion estimated based on motion sensor data, the first estimated direction will be accorded greater weight in determining the direction of motion of the mobile device in the time interval between capture times of the pair of image frames. Such weighting may be useful when large fluctuations in motion sensor data are detected (which may be attributed to inherent or accumulated error in the sensors).

In operation 612, the determined directions of motion for each pair of consecutive image frames may be collected as a sequence in order to obtain an estimated trajectory of the mobile device corresponding to the first sequence of image frames captured by the camera of the mobile device. That is, a trajectory of the mobile device may be determined based on directional information of the motion of the mobile device which corresponds to the image frames of the first sequence. In at least some embodiments, the directional trajectory of the mobile device may be supplemented by measurements of distance travelled by the mobile device during the time interval corresponding to each pair of consecutive image frames of the first sequence. For example, an accelerometer on the mobile device may be used to estimate the distance travelled by the mobile device during specified time intervals.

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method implemented by a processor of a mobile device for estimating a current location of the mobile device within an indoor facility, the mobile device having a first camera mounted on a first side of the mobile device, the method comprising:
    receiving a first sequence of image frames captured by the first camera, the first sequence of image frames being captured when the first camera is substantially faced toward a ceiling of the indoor facility;
    for each pair of consecutive image frames in the first sequence:
        identifying a transformation based on identifying changes between the pair of image frames in an image analysis of the image frames, and
        correlating the transformation with an estimated change in position of the mobile device;
    obtaining a first sequence of displacements based on the estimated changes in position of the mobile device for the pairs of consecutive image frames in the first sequence;
    receiving a second sequence of image frames captured by a second camera of the mobile device, the second camera being mounted on a second side of the mobile device opposite to the first side, each image frame of the second sequence being captured substantially simultaneously as a corresponding image frame of the first sequence;
    for each pair of consecutive image frames in the second sequence:
        identifying a transformation based on identifying changes between the image frames in an image analysis of the image frames; and
        correlating the transformation with an estimated change in position of the mobile device; and
    obtaining a second sequence of displacements based on the estimated changes in position of the mobile device for the pairs of consecutive image frames in the second sequence; and
    determining the current location of the mobile device within the indoor facility based on an initial location of the mobile device and the first and second sequences of displacements.

2. The method of claim 1, wherein a transformation between a pair of consecutive image frames comprises at least one of a translation and a rotation between the image frames.

3. The method of claim 1, further comprising obtaining, for each image frame in the first sequence, an accelerometer reading associated with the image frame, the accelerometer reading being taken at a time of capturing the image frame.

4. The method of claim 3, further comprising determining, for each image frame in the first sequence, a tilt of the mobile device relative to the ceiling of the indoor facility at a time when the image frame was captured, the tilt of the mobile device determined based on the accelerometer reading associated with the image frame.

5. The method of claim 1, wherein the current location of the mobile device within the indoor facility is determined based on the initial location of the mobile device and at least one of the first sequence of displacements and the second sequence of displacements.

6. The method of claim 1, further comprising:
    for each pair of consecutive image frames in the first sequence:
        obtaining motion data from one or more motion sensors associated with the mobile device, the motion data indicating an estimated direction of motion of the mobile device during a time interval between capture times of the pair of image frames,
    wherein the first sequence of displacements is obtained based on the estimated changes in position of the mobile device and the obtained motion data associated with the consecutive pairs of image frames in the first sequence.

7. The method of claim 6, wherein each displacement in the first sequence of displacements is obtained by weighting the estimated change in position of the mobile device and the obtained motion data associated with a pair of consecutive image frames.

8. The method of claim 6, wherein the one or more motion sensors include at least one of an accelerometer, a gyroscope and a magnetometer.

9. The method of claim 1, wherein the image frames of the first sequence are captured at regular time intervals.

10. A mobile device, comprising:
    a first camera on a first side of the mobile device;
    a memory;
    a processor coupled the first camera and the memory, wherein the processor is configured to:
        receive a first sequence of image frames captured by the first camera, the first sequence of image frames being captured when the first camera is substantially faced toward a ceiling of the indoor facility;
        for each pair of consecutive image frames in the first sequence:
            identify a transformation based on identifying changes between the pair of image frames in an image analysis of the image frames, and
            correlate the transformation with an estimated change in position of the mobile device;
        obtain a first sequence of displacements based on the estimated changes in position of the mobile device for the pairs of consecutive image frames in the first sequence;
        receiving a second sequence of image frames captured by a second camera of the mobile device, the second camera being mounted on a second side of the mobile device opposite to the first side, each image frame of the second sequence being captured substantially simultaneously as a corresponding image frame of the first sequence;
        for each pair of consecutive image frames in the second sequence:
            identifying a transformation based on identifying changes between the image frames in an image analysis of the image frames; and
            correlating the transformation with an estimated change in position of the mobile device; and
            obtaining a second sequence of displacements based on the estimated changes in position of the mobile device for the pairs of consecutive image frames in the second sequence;
        and determine the current location of the mobile device within the indoor facility based on an initial location of the mobile device and the first and second sequences of displacements.

11. The mobile device of claim 10, wherein a transformation between a pair of consecutive image frames comprises at least one of a translation and a rotation between the image frames.

12. The mobile device of claim 10, wherein the processor is further configured to obtain, for each image frame in the first sequence, an accelerometer reading associated with the image frame, the accelerometer reading being taken at a time of capturing the image frame.

13. The mobile device of claim 12, wherein the processor is further configured to determine, for each image frame in the first sequence, a tilt of the mobile device relative to the ceiling of the indoor facility at a time when the image frame was captured, the tilt of the mobile device determined based on the accelerometer reading associated with the image frame.

14. The mobile device of claim 10, wherein the current location of the mobile device within the indoor facility is determined based on the initial location of the mobile device and at least one of the first sequence of displacements and the second sequence of displacements.

15. The mobile device of claim 10, wherein the processor is further configured to:
  for each pair of consecutive image frames in the first sequence:
    obtain motion data from one or more motion sensors associated with the mobile device, the motion data indicating an estimated direction of motion of the mobile device during a time interval between capture times of the pair of image frames,
wherein the first sequence of displacements is obtained based on the estimated changes in position of the mobile device and the obtained motion data associated with the consecutive pairs of image frames in the first sequence.

16. The mobile device of claim 15, wherein each displacement in the first sequence of displacements is obtained weighting the estimated change in position of the mobile device and the obtained motion data associated with a pair of consecutive image frames.

17. The mobile device of claim 15, wherein the one or more motion sensors include at least one of an accelerometer, a gyroscope and a magnetometer.

18. The mobile device of claim 10, wherein the image frames of the first sequence are captured at regular time intervals.

19. A non-transitory computer-readable medium storing processor-executable instructions which, when executed, perform a method for estimating a current location of a mobile device within an indoor facility, the mobile device having a first camera mounted on a first side of the mobile device, the method comprising:
  receiving a first sequence of image frames captured by the first camera, the first sequence of image frames being captured when the first camera is substantially faced toward a ceiling of the indoor facility;
  for each pair of consecutive image frames in the first sequence:
    identifying a transformation based on identifying changes between the pair of image frames in an image analysis of the image frames, and
    correlating the transformation with an estimated change in position of the mobile device;
  obtaining a first sequence of displacements based on the estimated changes in position of the mobile device for the pairs of consecutive image frames in the first sequence;
  receiving a second sequence of image frames captured by a second camera of the mobile device, the second camera being mounted on a second side of the mobile device opposite to the first side, each image frame of the second sequence being captured substantially simultaneously as a corresponding image frame of the first sequence;
  for each pair of consecutive image frames in the second sequence:
    identifying a transformation based on identifying changes between the image frames in an image analysis of the image frames; and
    correlating the transformation with an estimated change in position of the mobile device; and
  obtaining a second sequence of displacements based on the estimated changes in position of the mobile device for the pairs of consecutive image frames in the second sequence; and
  determining the current location of the mobile device within the indoor facility based on an initial location of the mobile device and the first and second sequences of displacements.

20. A method implemented by a processor of a mobile device for facilitating navigation within an indoor facility, the mobile device having a first camera mounted on a first side of the mobile device, the method comprising:
  receiving a first sequence of image frames captured by the first camera, the first sequence of image frames being captured when the first camera is substantially faced toward a ceiling of the indoor facility;
  for each pair of consecutive image frames in the first sequence:
    identifying a transformation based on identifying changes between the pair of image frames in an image analysis of the image frames;
    correlating the transformation with a first estimated direction of motion of the mobile device during a time interval between capture times of the pair of image frames in the first sequence;
  receiving a second sequence of image frames captured by a second camera of the mobile device, the second camera being mounted on a second side of the mobile device opposite to the first side, each image frame of the second sequence being captured substantially simultaneously as a corresponding image frame of the first sequence;
  for each pair of consecutive image frames in the second sequence:
    identifying a transformation based on identifying changes between the image frames in an image analysis of the image frames; and
    correlating the transformation with a second estimated direction of motion of the mobile device during a time interval between captures times of the pair of image frames in the second sequence;
    obtaining motion data from one or more motion sensors associated with the mobile device, the motion data indicating a third estimated direction of motion of the mobile device during the time interval; and
    determining a direction of motion of the mobile device during the time interval based on at least one of the first, second, and third estimated directions; and determining a trajectory of the mobile device within the indoor facility corresponding to the first and second sequences of images frames based on a sequence of the determined directions of motion for the pairs of consecutive image frames in the first and second sequences.

* * * * *